United States Patent
Koelbl

(10) Patent No.: US 12,420,859 B2
(45) Date of Patent: Sep. 23, 2025

(54) METHOD FOR OPERATING AN ELECTROMECHANICAL STEERING ASSISTANCE DEVICE OF A VEHICLE

(71) Applicant: Bayerische Motoren Werke Aktiengesellschaft, Munich (DE)

(72) Inventor: Christian Koelbl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 74 days.

(21) Appl. No.: 18/269,997

(22) PCT Filed: Dec. 7, 2021

(86) PCT No.: PCT/EP2021/084525
§ 371 (c)(1),
(2) Date: Jun. 28, 2023

(87) PCT Pub. No.: WO2022/156950
PCT Pub. Date: Jul. 28, 2022

(65) Prior Publication Data
US 2024/0067259 A1    Feb. 29, 2024

(30) Foreign Application Priority Data
Jan. 21, 2021  (DE) .................... 10 2021 101 238.4

(51) Int. Cl.
B62D 5/04      (2006.01)
(52) U.S. Cl.
CPC ................. B62D 5/0463 (2013.01)

(58) Field of Classification Search
CPC .................. B62D 5/04; B60R 16/03
See application file for complete search history.

(56) References Cited

FOREIGN PATENT DOCUMENTS

| CN | 105359407 A | 2/2016 |
|----|-------------|--------|
| CN | 110325396 A | 10/2019 |
| DE | 10 2007 003 978 A1 | 7/2008 |
| DE | 10 2015 218 167 A1 | 3/2017 |
| DE | 102015116929 A1 | 4/2017 |

(Continued)

OTHER PUBLICATIONS

International Search Report (PCT/ISA/210) issued in PCT Application No. PCT/EP2021/084525 dated Apr. 4, 2022 with English translation (3 pages).

(Continued)

Primary Examiner — Lindsay M Low
Assistant Examiner — Charles J Brauch
(74) Attorney, Agent, or Firm — Crowell & Moring LLP

(57) ABSTRACT

A method operates an electromechanical steering assistance device of a vehicle. The steering assistance device is operated by a storage battery charged by an electric motor operated as a generator. It is predictively detected that the steering assistance device has, at a future time, a power demand higher than power currently requested for charging the storage battery. Following this detection, a higher voltage is applied to the storage battery at the future time so that the steering assistance device exerts the predicted higher power at the predicted time. The higher voltage is applied to the storage battery only if, in the predictive determination, it is detected that a design limit of the steering assistance device is reached and/or exceeded at the future time.

7 Claims, 1 Drawing Sheet

(56) References Cited

FOREIGN PATENT DOCUMENTS

DE   102016206348 A1    10/2017
DE   102018125534 A1 *  4/2020

OTHER PUBLICATIONS

German-language Written Opinion (PCT/ISA/237) issued in PCT Application No. PCT/EP2021/084525 dated Apr. 4, 2022 (7 pages).
German-language Search Report issued in German Application No. 10 2021 101 238.4 dated Jul. 16, 2021 with partial English translation (11 pages).
German-language Decision Granted issued in German Application No. 10 2021 101 238.4 dated Sep. 1, 2021 (10 pages).
Chinese-language Office Action issued in Chinese Application No. 202180089759.X, dated Jul. 16, 2025, with English translation (14 pages).

* cited by examiner

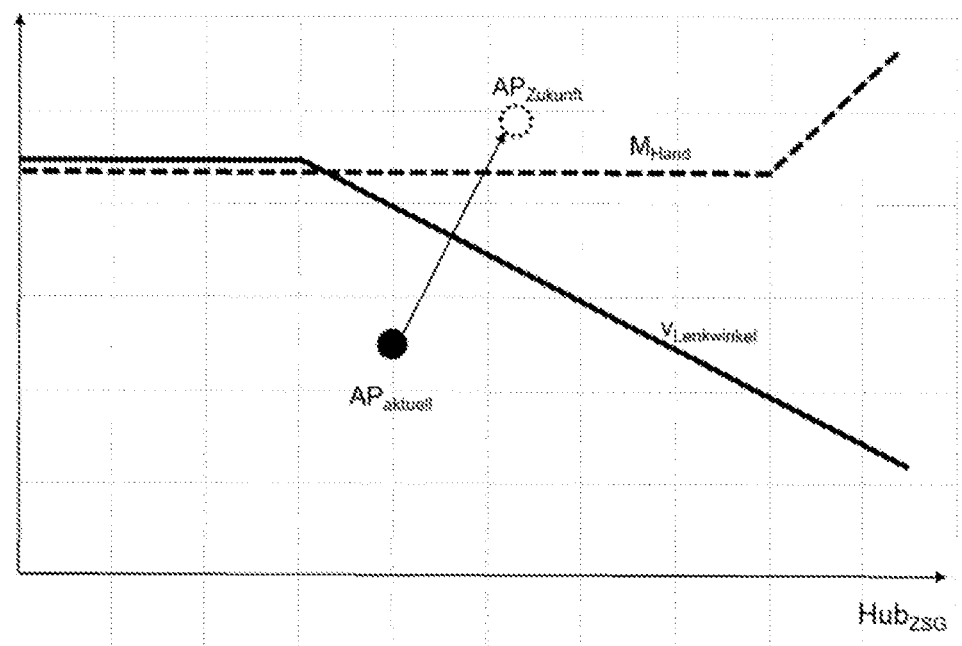

METHOD FOR OPERATING AN ELECTROMECHANICAL STEERING ASSISTANCE DEVICE OF A VEHICLE

BACKGROUND AND SUMMARY

The invention relates to a method for operating an electromechanical steering assistance device of a vehicle and to a computer product.

With respect to the prior art, for exemplary purposes, reference may be made to DE 10 2015 2018 167 A1.

The on-board network of a vehicle comprises a cable harness, an energy store, an energy source and electrical loads. In principle, a plurality of energy stores or energy sources can also be employed. Whereas, in a conventional vehicle having a 12 V on-board network, a generator is employed as an energy source, the supply of power in electric or hybrid vehicles is assumed by a DC/DC converter (direct current/direct current converter) which, in turn, is connected to a high-voltage on-board network having a high-voltage accumulator. The peak capacity of these energy sources is customarily dimensioned such that the average capacity of all systems installed in the vehicle can be accommodated. However, the peak capacity of installed systems can be a multiple of times greater than the average capacity. Whereas DC/DC converters have an extensive dynamic response, the generator of a vehicle, on structural grounds, is limited in its dynamic response. At present, on the grounds of energy efficiency, an increasing number of vehicle components of a vehicle are electrified, thereby resulting in a substantial increase in the loading of the 12 V on-board electrical network. A power steering system (also described as a steering assistance system) is also supplied with current and voltage from the 12 V on-board electrical network.

An electric power steering system, as a dynamic peak capacity load, assumes a greater dynamic response than the generator. This gives rise to an issue, in that the alternator, in the event of dynamic loading, cannot deliver the electric current required, which demand must then be covered by the battery or by another store, by way of an energy store. On the grounds of the internal resistance of the battery, the output of current additionally results in voltage dips at the battery terminals. In particular, dynamic peak capacity loads, such as an electric power steering system, can thus result in severe voltage dips. This issue can also occur in on-board networks in which a DC/DC converter is employed as an energy source. However, in the event of dynamic loading of the on-board network, it is only necessary for the battery to function as an energy buffer once the DC/DC converter has reached its capacity limit, although the regulation function of a DC/DC converter is more rapid than the regulation function of a generator.

In steering capacity-intensive driving situations, in order to achieve an optimum performance of the steering system, particularly of the electric power steering system, existing software-based functions are employed as a means of increasing voltage, e.g. by the switch-in of a generator. An exemplary method is described in DE 10 2015 218 167 A1.

In general, in known measures from the prior art, a distinction is drawn between reactive and predictive measures. Reactive measures raise the voltage in response to current driver inputs including, for example, the steering angle, steering angle speed or steering torque, or employ data from the steering system including, for example, the present current consumption or a present mechanical and/or electric power take-up.

Conversely, predictive measures (as disclosed, for example, in DE 10 2015 218 167 A1) endeavor to identify steering capacity-intensive driving situations by reference to experienced-based use-cases.

Reactive measures have a disadvantage, in that they are implemented too late in time. On the grounds of computing times, signal propagation times and physical inertia, the increase in voltage in systems of this type is frequently achieved too late. During the steering process, a vehicle occupant will then perceive a short-term heaviness in the steering handle, which will disappear immediately once the voltage in the 12 V on-board electrical network is raised. "Heaviness" of this type can be perceived as uncomfortable by a vehicle occupant.

Conversely, predictive measures execute a prompt increase in voltage but, on the grounds of their imprecision, can also result in unnecessary increases in voltage, which are not required by the steering system. Predictive measures thus have a negative impact upon $CO_2$ emissions, energy consumption and the potential electrical range of an electric vehicle.

The object of the invention is thus the disclosure of a method for operating an electromechanical steering assistance device which provides the maximum possible driver comfort, and simultaneously ensures the minimum possible energy consumption.

This object is fulfilled by a method for operating an electromechanical steering assistance device and by a computer product, according to the independent claims. Advantageously embodiments and further developments are the subject matter of the dependent claims.

A method for operating an electromechanical steering assistance device is proposed.

In particular, an electromechanical steering assistance device of this type can be configured in the form of a "servomotor" or "power steering system". The function of a power steering system is a reduction of the force required to operate the steering handle of a vehicle from a standstill, during maneuvering or at low driving speeds. The power steering system supports the driver during steering, wherein the steering force applied by the driver is enhanced by an electric motor.

The steering assistance device is operated by means of an accumulator, which is charged by an electric motor operating in generator mode.

It is particularly preferred that the steering assistance device is supplied with current and voltage by an on-board electrical network consisting of an accumulator or battery (particularly a 12 V battery) and a generator.

In place of the generator, a "DC/DC converter" can also be connected between the voltage level of the steering system and the voltage level of the electric motor operating in a generator mode, by means of which the steering assistance device is supplied with current and voltage by a charged accumulator.

It is particularly preferred that the above-mentioned on-board electrical network, to which the electromechanical steering assistance device is connected, is a "12 V on-board electrical network". The method is particularly appropriate for a low-voltage on-board network. However, the method can also be executed on other on-board electrical networks including, for example, a 24 V or 48 V on-board network.

It is preferably provided that the charging and discharging of the accumulator and, as a result, the capacity setpoint, and particularly the voltage setpoint of the accumulator, are configured by means of a power and energy management system of the vehicle.

The voltage which is dictated by the power management system is particularly configured, in a variable manner, according to a current driving situation, a state-of-charge of a battery, or a current power and energy take-up of electrical loads which are present in the motor vehicle.

As a result of the above-mentioned variable voltage setpoint on the battery, voltages can occur at the terminals of the electromechanical steering assistance device which can lie below the rated design voltage of the electromechanical steering assistance device.

Accordingly, it can further be provided that, in a predictive manner, it is established that the steering assistance device, at a future time point, will have a power demand which is higher than the power which is currently requested for charging the accumulator, particularly by the power and energy management system.

A future voltage demand at the terminals of the steering assistance device can thus be detected or determined.

This predictive determination of power demand or, in particular, the determination of voltage demand is executed, for example, by means of mathematical extrapolation methods, by means of one or more neural networks, or by means of similar predictive or evaluation mechanisms.

If it is determined or calculated that, at a future time point, the steering assistance system will have a higher power demand or, in particular, a higher voltage demand, a higher voltage will be applied to the accumulator at this time point. This is preferably executed wherein, upon the detection of a higher voltage demand, a correspondingly higher voltage is requested by the power and energy management system, such that this higher voltage is available at the future time point.

This voltage increase is only in force on a short-term basis, according to the respective situation, and is cancelled again thereafter, preferably where an increased voltage is no longer required.

It is provided that the above-mentioned voltage increase on the accumulator, or the preferential demand for a higher voltage by the power and energy management system is only executed on condition that the steering assistance device, at the future time point, a or the design limit of the steering assistance system is achieved or exceeded.

The electromechancial steering assistance device is preferably designed by reference to characteristics for the steering angle speed associated with the steering rack stroke or steering angle, and for the steering torque (also described as the "manual torque") associated with the steering rack stroke or steering angle.

Accordingly, the steering unit of the vehicle is preferably a "rack and pinion" steering system in which, for example, a pinion which is connected to the steering handle by means of a steering column engages with a rack. By the rotation of the steering handle by the vehicle occupant (by the application of the above-mentioned manual torque), the rack is displaced, and the steered wheels are pivoted through a specified steering rack stroke.

The steering assistance device supports the driver wherein, by means of an electric motor, the force required to move the steering handle is at least partially provided for the driver, such that the driver is only required to apply a reduced manual torque.

The term manual torque describes the torque which it is necessary for a vehicle occupant to apply to a steering handle (for example to a steering wheel) in order to execute the steering of the vehicle.

The term rack stroke describes the path of translational movement of the steering rack which contributes to the definition of a specific steering angle on the vehicle wheel.

Accordingly, the design limit of the steering assistance device is preferably dictated by a steering angle speed characteristic curve and by a manual torque characteristic curve. Both characteristic curves are plotted over the course of the steering rack stroke (or steering angle) of the steering unit. This means that, in all cases, for a maximum steering angle speed, a maximum manual torque (and, vice versa, in all cases, for a maximum manual torque, a maximum steering angle speed) for a specific steering rack stroke is dictated by the characteristic curves.

For example, if a driver steers to a specific rack stroke on the steering angle speed characteristic curve, the manual torque must not exceed the manual torque characteristic curve. Conversely, it must be possible for a driver to achieve the maximum steering angle speed according to the steering angle speed characteristic curve by the application of a manual torque according to the manual torque characteristic curve. In both the above-mentioned cases, operation of the steering assistance device will lie within the design limit.

Only if it is detected that, at a future time point, both characteristic curves will be reached or exceeded, and the design limit of the steering assistance device will thus be achieved or exceeded, will the above-mentioned voltage increase preferably be initiated or requested.

This additional condition, upon which the voltage increase is dependent, permits the avoidance of any unnecessary voltage increases. This applies on the grounds that the achievement of the design limit of the steering assistance device, conversely to extrapolated or estimated data, represents an accurate measure of the actual occurrence of an above-mentioned initial "heaviness" in the steering for a vehicle driver. A voltage increase is only executed in the event of an actual achievement or overshoot of the design limit of the steering assistance device.

At the same time, by the predictive anticipation of an increased power demand at a future time point, it can be ensured that a voltage increase only occurs if the speed or magnitude of steering executed by the driver is such that, in the absence of a voltage increase, they would perceive a heaviness in steering, and that the increase is implemented sufficiently promptly to ensure that any such short-term initial heaviness is precluded.

As a result, the above-mentioned negative impacts upon $CO_2$ emissions, energy consumption or electrical range associated with predictive measures according to the prior art can be substantially reduced, or eliminated altogether.

For example, in the event of rapid steering with a limited manual torque, the steering assistance device will not necessarily reach its design limit. During uphill driving, for example, with a reduced load on the front axle, a high steering angle speed can be achieved by the application of a limited steering torque. Even during slow steering, with a high steering torque, the steering assistance device will not necessarily reach its design limit. In this regard, reference may be made to a situation in which the steering angle of the front wheels achieves a "limit stop", which results in mechanical blocking and a consequent increase in the steering torque.

This means that, by the dependence of the voltage increase upon the design limit of the steering assistance device, the accuracy of determination as to whether a higher power demand from the steering assistance device will actually be required at a future time point can be increased. As a result, unnecessary voltage increases at this future time point can be avoided.

An option is further provided for the avoidance of the installation of a cost-intensive multi-voltage on-board network (400 V, 60 V, 48 V, 24 V or 12 V), and for the continuing employment of a low-voltage on-board network. Manufacturing costs can be saved as a result. In vehicles, particularly in budget or mid-range vehicles, an option is further provided for the installation of a steering system with a lower capacity rating, which is also associated with a cost saving.

In a preferred configuration of the method claimed, it is determined, at repeated time intervals, whether the steering assistance device, at further future time points, will have a higher power demand than the power which is currently requested, particularly by the power and energy management system, for charging the accumulator. In particular, this determination is executed at intervals of 1 to 15 ms, wherein execution at intervals of 10 ms is particularly preferred.

By the execution of detection processes at such a high frequency, it can be ensured that, at virtually all times, it is possible to establish whether a higher power demand will be requested at a future time point.

The predictive time interval for determining whether the steering assistance device will have an increased power demand at future time points is preferably selected such that, at a respectively determined future time point, the steering assistance device will operate with an increased capacity, and particularly with an increased voltage. Accordingly, the predictive time interval is selected for the prompt assurance that a vehicle driver will perceive no above-mentioned "heaviness" in steering.

The predictive time interval preferably lies within a range of approximately 100 to 2,000 ms, wherein a range between 500 and 1,500 ms is particularly preferred.

These and further features proceed from the claims and the description, and from the drawings wherein, in each case, individual features can be realized in isolation or can be mutually combined, in sub-combinations, in an embodiment of the invention, and can thus advantageously represent embodiments which are patentable per se, for which protection is claimed herein.

The invention is further described hereinafter with reference to an exemplary embodiment. All features which are described in greater detail can be key to the invention.

BRIEF DESCRIPTION OF THE DRAWING

FIG. 1 is a diagram representing exemplary design limits of a steering assistance device.

DETAILED DESCRIPTION OF THE DRAWING

Accordingly, the design limit of a steering assistance device is preferably dictated by a steering angle speed characteristic curve $v_{SteeringAngle}$ and by a manual torque characteristic curve $M_{Manual}$. Both characteristic curves are plotted over the course of the steering rack stroke $Stroke_{GearRack}$ of the steering unit. According to the design limit, it is provided that, in all cases, for a maximum steering angle speed, a maximum manual torque (and, vice versa, in all cases, for a maximum manual torque, a maximum steering angle speed) for a specific steering rack stroke is dictated by the characteristic curves.

For example, it can be seen that, once an advanced steering rack stroke $Stroke_{GearRake}$ has been achieved, the manual torque $M_{Manual}$ rises strongly, whereas the steering angle speed reduces. This situation is possible, for example, during a parking maneuver of the vehicle at a near-stationary speed, in which the steering system is close to its limit stop and in which only a very low steering angle speed $v_{SteeringAngle}$ is in force.

In a first step, for example by extrapolation, evaluation methods, etc., it is established that the steering assistance device, at a future time point or at a future working point $WorkingPoint_{Future}$, will have a power demand which exceeds the power currently requested for charging the accumulator at a current working point $WorkingPoint_{Current}$ of the steering assistance device.

To this end, the current working point $WorkingPoint_{Current}$ of the steering assistance device is determined at the current time point, which lies within the design limit, in this case below both characteristic curves $M_{Manual}$ and $v_{steeringAngle}$.

Thereafter, the future working point $WorkingPoint_{Future}$ (represented by a dotted line) is predicted within the requisite predictive time interval, for example by means of extrapolation. In this case, the predicted working point $WorkingPoint_{Future}$ overshoots both design characteristics of the steering assistance device (see arrow). As both characteristic curves $M_{Manual}$ and $v_{SteeringAngle}$ are exceeded at the future working point $WorkingPoint_{Future}$, a voltage increase is triggered.

A higher voltage is thus applied to the accumulator in response to a request for an increased voltage from the power and energy management system of the vehicle, such that the power assistance device receives the predicted higher voltage at the predicted working point $WorkingPoint_{Future}$.

However, such triggering will only occur if both characteristic curves $M_{Manual}$ and $v_{steeringAngle}$ have been reached or exceeded.

If only one of the characteristic curves $M_{Manual}$ and $v_{SteeringAngle}$ has been exceeded, and the other has not, no above-mentioned voltage increase will occur, as the design limit of the steering assistance device has not been achieved.

Any unnecessary increase in the voltage on the accumulator, and thus any unnecessary energy consumption, can thus be avoided. At the same time, a comfortable steering process for a vehicle driver is permitted, in the event that an increased voltage is actually required.

The invention claimed is:

1. A method for operating an electromechanical steering assistance device of a vehicle, the method comprising:
  operating the steering assistance device via an accumulator, which is charged by an electric motor operating in generator mode;
  establishing, in a predictive manner, that the steering assistance device, at a future time point, will have a power demand which is higher than power which is currently requested for charging the accumulator;
  further to said establishment of a future time point, applying a higher voltage to the accumulator, such that the steering assistance device, at the predicted time point delivers the predicted higher power, wherein
  the higher voltage is only applied to the accumulator in an event that it is determined, by prediction, that a design limit of the steering assistance device at the future time point will be reached or exceeded,
  the design limit of the steering assistance device is dictated by a steering angle speed characteristic curve and by a manual torque characteristic curve for a manual torque which is applied by a vehicle occupant to a steering handle, the steering angle speed characteristic curve dictates a limiting steering angle speed of at least one vehicle wheel of the vehicle, according to a steering rack stroke of a steering device of the vehicle, the manual torque characteristic curve dictates a limiting manual torque applied by a vehicle occupant for operating the steering handle of the vehicle, according to a steering rack stroke, and the higher voltage is only applied to the accumulator in the event that it is determined that both the steering angle speed characteristic curve and the manual torque characteristic curve of the steering assistance device at the future time point will be achieved and/or exceeded.

2. The method according to claim 1, wherein the steering assistance device is operated by a 12 V accumulator.

3. The method according to claim 1, further comprising:
determining, at repeated time intervals, whether the steering assistance device, at future time points, will have a higher power demand than the power which is currently requested for charging the accumulator.

4. The method according to claim 3, wherein
a predictive time interval for determining whether the steering assistance device will have an increased power demand at future time points is selected such that, at a determined future time point, the steering assistance device will operate with an increased capacity.

5. The method according to claim 4, wherein the predictive time interval lies within a range of approximately 150 to 2,000 ms.

6. The method according to claim 1, wherein
the predictive determination of the power demand of the steering assistance device is executed via mathematical extrapolation.

7. A computer product comprising a non-transitory computer readable medium having stored thereon program code which, when executed by one or more processors, performs the method according to claim 1.

* * * * *